Jan. 1, 1957 E. A. GOLDBERG 2,776,334

COLOR TELEVISION TRANSMITTER BURST INJECTION

Filed June 16, 1950

INVENTOR
EDWIN A. GOLDBERG
BY
ATTORNEY

United States Patent Office 2,776,334

Patented Jan. 1, 1957

2,776,334

COLOR TELEVISION TRANSMITTER BURST INJECTION

Edwin A. Goldberg, Princeton Junction, N. J., assignor to Radio Corporation of America, a corporation of Delaware Application June 16, 1950, Serial No. 168,501

5 Claims. (Cl. 178—5.4)

Figure 1:
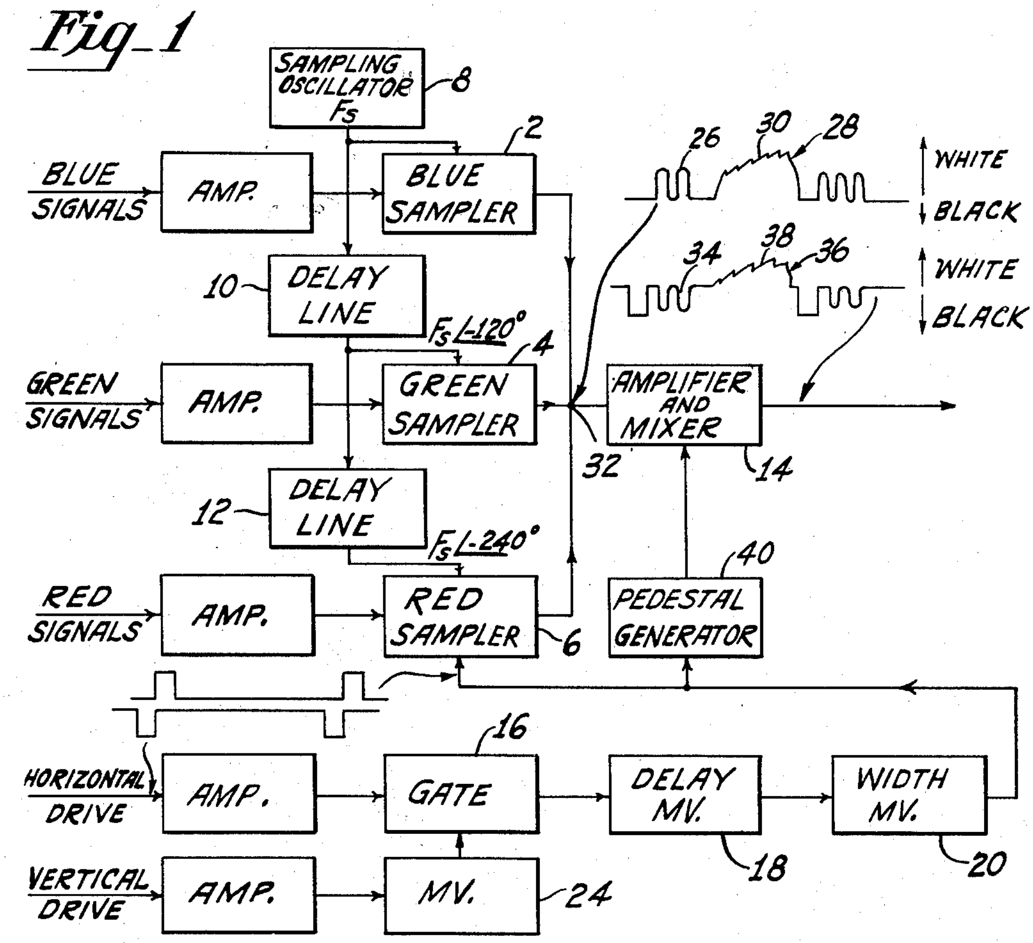

This invention relates to apparatus for generating synchronizing signals in a television transmitter.

In particular, the invention relates to apparatus for generating these synchronizing signals so that their phase relationship to the intelligence bearing signals in a time division multiplexing transmitter is constant.

In accordance with one well known color television system, samplers at the transmitter cause the transmitted signal to successively represent the intensities of each of a plurality of component colors. At the receiver these signals are detected. The detected signal is thus applied to a distributor which applies each of the successive signals to a means for reproducing images of the color the particular signal represents. It is obviously necessary to provide some means of synchronizing the phase and frequency of the distributor at the receiver with the phase and frequency of the samplers at the transmitter if the signals corresponding to each component color will be applied to the proper reproducing means.

It has previously been suggested that the distributor at the receiver be controlled by an oscillator and that this oscillator be synchronized with a burst of voltage waves of the desired frequency that are mixed with the transmitted signal. As is well known to those skilled in the art, the video information is blanked out during regularly recurring intervals so as to permit horizontal synchronizing pulses to be transmitted. It has previously been suggested that this burst of additional synchronizing signal be transmitted during a portion of these blanking intervals immediately following the horizontal sync pulses or, in other words, during the back porch interval. However, due to variations in installation, as well as variations in the characteristics of various component parts, it has been found that the phase of this synchronizing signal may change with respect to the phase of the samplers at the transmitter. This means that an adjustable phase control must be employed at the distributor of the receiver. Even this, however, is unsatisfactory, as it would need adjustment as the television receiver is tuned from one station to another.

In accordance with one aspect of this invention, the sampler itself generates the burst of synchronizing frequencies so that there can be no difference in phase between the burst so generated and the sampler. Briefly, this objective is obtained by unblanking one of the samplers employed in the transmitter during the normal blanking intervals.

This invention also provides certain improvements in the samplers' blanking signals described in the U. S. application, Serial No. 138,168, filed on January 12, 1950 in the name of Edwin A. Goldberg. By employing these improvements, the recovery time of the samplers is sufficiently increased to permit blanking insertion to be made at the sampler without losing the video information that immediately follows the blanking signals.

It is accordingly another object of this invention to provide a sampler to which blanking signals may be applied without losing any video information.

Figure 2:
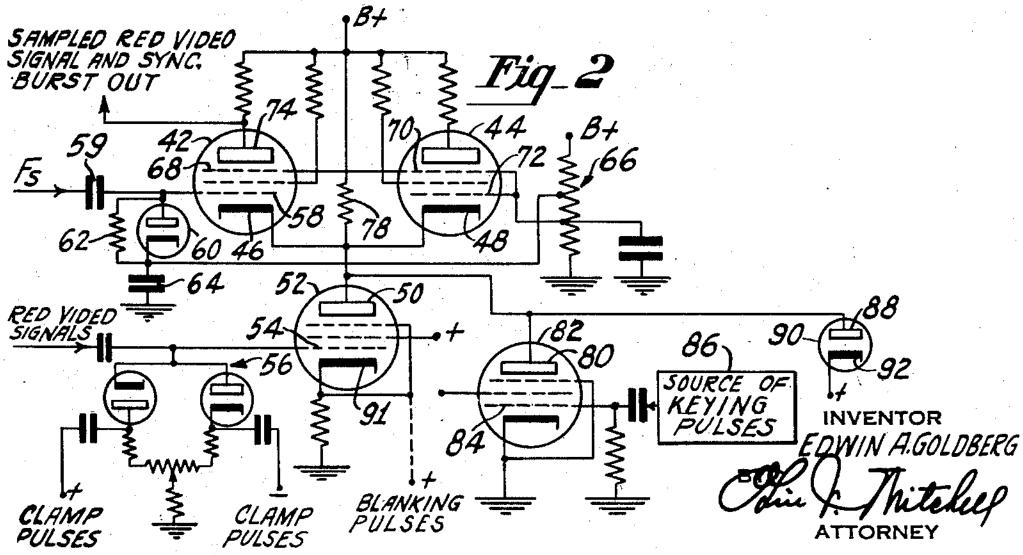

Other objects of this invention will be apparent from a detailed consideration of the drawings in which:

Figure 1 illustrates in block diagram form a transmitter employing the principles of this invention; and Figure 2 illustrates in schematic form the details of a sampler to be used in the transmitter of Figure 1.

The various features of the invention, described above, will be explained in connection with a color television transmitter shown in Figure 1. In this arrangement, the blue video signals are applied to a blue sampler 2, the green video signals are applied to a green sampler 4, and the red video signals are applied to a red sampler 6. Each of these samplers operates to pass a portion of its corresponding video signal during successive instants of time. This can be effected by gating the sampler with sine wave oscillations Fs or other appropriate sampling signals supplied by a sampling oscillator 8. The sine wave is applied directly to the blue sampler 2. After passing through a delay line 10, it is applied to the green sampler 4, and after passing through the delay line 10 and a delay line 12, it is applied to the red sampler 6. As indicated in the drawings, each of the delay lines 10 and 12 may shift the phase of the sine wave oscillations provided by the sampling oscillator 8 by 120 degrees. The outputs of the samplers 2, 4 and 6 are then applied to an amplifier and mixer 14.

The following discussion relates to an apparatus shown in Figure 1 for generating keying pulses that are used to key the sine wave oscillations provided by the sine wave oscillator 8 into the transmitted signal. Although the details of this apparatus do not form a part of this invention, its overall operation will be briefly reviewed. In accordance with the principles of the apparatus disclosed in the U. S. application bearing the U. S. Serial No. 153,882 filed April 4, 1950 of David G. C. Luck and Leslie L. Burns Jr., a pulse is generated during the back porch interval which, as noted above, occurs immediately following the horizontal synchronizing pulses that are superimposed upon the horizontal blanking pulses. In accordance with the principles set forth in the above-identified application, these pulses are not generated during various portions of the vertical blanking time. Horizontal drive pulses are applied to a gate 16. Those pulses that are passed through the gate 16 trigger a delay 18 which, in turn, trips a width multivibrator 20. The multivibrator 18 controls the time interval between the trailing edge of the horizontal drive pulses and the beginning of the desired keying pulse. The multivibrator 20 controls the duration of this pulse. The pulses are applied to the red sampler 6. In accordance with the apparatus set forth in the above application, the vertical drive pulses trigger a multivibrator 24 which, in turn, prevents signals from passing through the gate 16 during a desired portion of vertical blanking.

The samplers 2, 4 and 6 are normally biased to cutoff except during certain portions of the sine wave supplied by the sampling oscillator 8. They are also rendered incapable of passing video information during the time in between line scanning intervals. The keying pulses, the derivation of which has just been described, are applied to the red sampler 6 when it would normally be blanked out. Their polarity is such as to render the red sampler 6 capable of being unblanked by the sine wave supplied by the sampling oscillator 8 via the delay lines 10 and 12. In this way, a series of pulses such as indicated by the numeral 26 in wave form 28 will appear during the blanking interval just preceding the video signals 30. This wave form is found at the junction 32 of the outputs of the samplers 2, 4 and 6. Inasmuch as the pulses 26 are generated by the pulses emanating from the sampler 6, it can be seen that they are in phase with the red pulses sent out by the red sampler 6 when the video signal 30 is being transmitted. In other words, they can be said to be red pulses. Therefore, regardless of the installation design, the synchronizing pulses 26 will always be red.

It will be noted, however, that these pulses occur in the white direction. That is, in accordance with present television standards, they would tend to unblank the kinescopes in the receivers. This would have an unsatisfactory effect on the image being reproduced and, therefore, the D. C. level of the pulses 26 is changed, as illustrated by the pulses 34 shown in the wave form 36. In this wave form, the pulses 34 extend in the opposite direction from the white video signals indicated by the numeral 38. Inasmuch as they extend into the blacker than black region, they will not unblank the kinescopes at the receivers and no difficulties will ensue. This change in the D. C. level of the synchronizing pulses 26 is effected by another arrangement shown in the above-identified application. The pulses supplied by the multivibrator 20 are applied via pedestal generator 40 to the amplifier and mixer 14. When they are added to the waveform 28, they produce the waveform 36.

The schematic diagram shown in Figure 2 illustrates the details of the sampler 6 of Figure 1. The other samplers are similar in construction and the differences will be pointed out as the description proceeds. The sampler is essentially comprised of a pair of electron discharge devices 42 and 44. The cathodes 46 and 48 of the electron discharge devices 42 and 44 are tied together and connected to the plate 50 of another electron discharge device 52. The electron discharge device 52 forms a discharge path between the cathodes 46 and 48 and ground potential. Preferably, this device is a pentode in order that variations in plate potential may not affect the current passed thereby. However, other types of tubes may be used if desired. The impedance of the discharge path presented by the device 52 is varied in accordance with the red video signals as they are applied to a grid 54 of the device 52. The numeral 56 generally indicates a keyed clamped circuit for controlling the D. C. level for the signals applied to the grid 54. An adequate explanation of such a circuit is given in an article entitled "Television D. C. Component" published in the March 1948 issue of the RCA Review on pages 85 through 111.

A grid 58 of the electron discharge device 42 is connected to a clamping circuit consisting of a diode 60 and parallel resistance 62. The cathode of the diode 60 is connected to ground by a condenser 64 and also to a suitable point of fixed potential on a potentiometer 66. Thus, the grid 58 cannot exceed this potential. The sampling signal such as may be derived by the delay line 12 of Figure 1 is applied to the grid 58 through the capacitor 59. A grid 68 of the electron discharge device 42 and the grid 70 of the electron discharge device 44 and a grid 72 also of the electron discharge device 44 are tied together and to a lower fixed potential on the potentiometer 66. The plates and screen grids of the amplifiers 42 and 44 are connected to a source of B+ potential through suitable loading resistors. The output of the sampler is derived at the plate 74 of the electron discharge device 42. The plate 50 of the electron discharge device 52 and the cathodes 46 and 48 of the electron discharge devices 42 and 44 are also connected to B+ through a suitable load resistor 78. The plate 50 of the electron discharge device 52 is connected to the plate 88 of a diode 90. A cathode 92 of the diode 90 is connected to a suitable positive potential. The circuitry just described also corresponds to that required by the blue sampler 2 and the green sampler 4 as well as to the red sampler 6 of Figure 1.

The following relate to the additional details required in the red sampler 6 of Figure 1. The plate 50 of the electron discharge device 52 is connected to a plate 80 of an electron discharge device 82. A grid 84 of the electron discharge device 82 is connected to a source of pulses 86 which may include all of the apparatus associated with the multivibrator 20 of Figure 1. Suitable positive blanking pulses may be inserted at the cathode 91 of the electron discharge device 52.

*Operation*

Before proceeding with a detailed description of the operation of the device, certain terminology should be clarified. It has been previously stated that the sampled video signals representing the televised images are interrupted by blanking signals at periodically recurring intervals. The polarities of the video signal are such that a decrease in the amplitude of the signal represents a darker picture. A certain predetermined amplitude, therefore, represents the black level in the televised image. The output of the sampler during blanking is generally lower than the video black level by an amount termed the "set up" of the signal. The reason for this set up is to insure that the signals are blanked out.

Ignoring for the moment the electron path that may be furnished by the electron discharge device 82, it is clear that when the electron discharge device 52 is cut off during blanking by the application of blanking pulses to the cathode 91, no electrons can flow through either of the electron discharge devices 42 and 44. Therefore, there can be no variations in the output taken at the plate 74 of the electron discharge device 42. When, however, the electron discharge device 52 is not blanked and its impedance is being varied in accordance with the red video signals, the biases are such that the electron discharge device 44 is in a conducting condition. However, the potential of the cathodes 46 and 48 is sufficiently positive with respect to the grid 58 of the electron discharge device 42 to prevent the latter from conducting. When the sampling signal Fs supplied by the delay line 12 (Figure 1) to the grid 58 is sufficiently positive, the electron discharge device 42 goes into conduction. Momentarily, both of the electron discharge devices 42 and 44 are conducting, but the increase in the potential of the grid 58 soon increases the potential of the cathodes 46 and 48 to such a point that the electron discharge device 44 is cut off. It will be noted in this respect that the grid 58 is connected to a more positive point on the potentiometer 66 than is the grid 72.

Therefore, every time the sampling signal applied to the grid 58 of the electron discharge device 52 nears the positive crest in its cycle, the red video signals present on the grid 54 of the electron discharge device 52 are permitted to control the amount of current passing through the electron discharge device 42. Thus, the pulses available at the plate 74 of the electron discharge device 42 are varied in amplitude in accordance with the intensity of the red video signals. Naturally, when the electron discharge device 52 is blanked out, no current can flow through electron discharge device 42 or the electron discharge device 44, and the sampling signals supplied to the grid 58 of the electron discharge device 42 have no effect. When the sampling sine wave applied to the grid 58 starts to decrease, the cathode coupling to the electron discharge device 44 tends to prevent the cathode 46 from following the grid 58. If this were not so, the device 42 would not be cut off at the proper time.

As noted above, the impedance of the discharge path presented by the electron discharge device 52 is varied in accordance with the red video signals that are applied to the grid 54. The value of the B+ potential, the plate load resistor 78 and the other circuit components are selected so that when the red video signals have zero value, the electron discharge device 52 will still conduct at the lower point of the linear portion of its plate current vs. grid voltage characteristic, yet no current will pass through either electron discharge devices 42 and 44. When the blanking signals are supplied they are positive in value by a sufficient amount to insure that the discharge device 52 is cut off. When the electron discharge device 52 is cut off, however, the plate 50 and hence the cathodes 46 and 48, cannot rise above the potential of the cathode 92 of the diode 90. The cathode 92 of the diode 90 can be at a potential that just cuts off the electron discharge devices 42 and 44. When it is desired to permit the electron discharge device 52 to pass video signals once again, the stray capacitances associated with its plate circuit need only discharge a few volts in order that one of the electron discharge devices 42 or 44 may conduct. If it were not for the diode 90, however, the cathodes 46 and 48 would rise to B+ potential and the stray capacitances of the circuit would have to discharge the voltage between B+ and the cut off potential of the cathodes 46 and 48 before the cathodes 46 and 48 could reach a sufficiently low positive potential to permit one of the devices 42 or 44 to conduct. This, of course, would interfere with the speed of recovery of the sampler circuit. As a consequence, the sine wave applied at the grid 58 of the electron discharge device 42 would not cause samples of the video information to be passed on to the transmitter until the device 42 could conduct. This would result in the loss of a portion of the image at the beginning of the horizontal scans.

*Specific operation of one feature of the invention*

The discussion noted above has related to the operation of the samplers such as 2 and 4 of Figure 1. It has been explained that when the blanking signals are applied to the electron discharge device 52, it is cut off and no current is therefore available to the electron discharge devices 42 and 44. When, however, the electron path furnished by the electron discharge device 82 is considered, electrons may be furnished the tubes 42 and 44 during the blanking interval. This occurs during the positive keying pulses supplied by the source 86 to the grid 84 of the electron discharge device 82. These positive keying pulses are those emanating from the multivibrator 20 of Figure 1 and occur following the horizontal sync pulses. Therefore, when each sampling signal applied to the grid 58 of the amplifier 42 becomes sufficiently positive, the plate 74 will furnish a pulse such as indicated by the numeral 26 in Figure 1, as previously pointed out. The sampling signal itself, therefore, generates these pulses, and the pulses 26 cannot help but be in phase with the sampling signals provided by the delay line 12 in Figure 1.

Having thus described my invention, what is claimed is:

1. In a color television transmitter apparatus for injecting a burst of alternating current energy into the transmitted signal during the line blanking intervals comprising in combination, a source of alternating current waves, means having a plurality of outputs for respectively providing different phases of the alternating current waves supplied by said source, a plurality of modulators, each of said modulators having a first input to which a wave to be modulated may be applied, a second input to which an intelligence signal may be applied and an output, means for coupling each first input of each modulator to one of said plurality of outputs respectively of the means for providing different phases of said alternating current waves, a plurality of sources of different color signals, a first source of pulses occurring during the line blanking intervals, a second source of pulses occurring during the portion of the line blanking interval during which said burst of alternating current energy is to be introduced into the transmitted signal, means for coupling each of said plurality of color signals to a corresponding second input of one of said plurality of modulators, means for disabling each of said latter coupling means and said modulators in response to the pulses provided by said first source so that no signals appear at the outputs of said modulators and means for making one of said modulators operative in response to said pulses from said second source to such an extent that only the alternating current wave applied to its first input produces signals at its output terminals.

2. Apparatus for inserting a burst of alternating current energy into the signal of a color television transmitter during the horizontal blanking interval comprising in combination a plurality of modulators each having an output, a source of alternating current waves, means for deriving at respectively different outputs different phases of said waves, said latter means being coupled to said source, means for coupling each of said respectively different outputs to a different one of said modulators, a plurality of sources of color signals, means for coupling each of said latter sources to a different one of said modulators whereby each differently phased alternating current wave is amplitude modulated in accordance with one of said color signals and appears in each of said modulator outputs respectively, means for blanking all but one of said modulator outputs during a portion of the horizontal blanking intervals, said last-named unblanked modulator thereupon producing only a portion of alternating current wave in its output and means for combining the outputs of said modulators.

3. Apparatus for inserting a burst of alternating current waves into the signal produced by a color television transmitter during the horizontal blanking intervals comprising in combination a plurality of modulators, means having a plurality of outputs for respectively providing different phases of an alternating current wave, means for respectively coupling each of said plurality of outputs to a different one of said plurality of modulators, a source of a plurality of color signals, means for coupling each of said color signals to a different one of said modulators only during the line scanning intervals that occur between the horizontal blanking intervals, and means for applying a pulse to at least one of said modulators during the horizontal blanking intervals whereby at least one of said modulators is enabled to pass the alternating current waves applied to them for a brief interval during each horizontal blanking interval.

4. In a color television transmitter apparatus adapted to sample one of the color signals and also adapted to provide a burst of sampling frequency during the horizontal blanking periods comprising in combination a first amplifier having at least a plate, a grid and a cathode, a source of sampling waves, means for coupling said waves to said grid, a second amplifier having at least a plate, a grid and a cathode, a source of positive direct current potential, load impedances connected between each of said plates and said source of potential, an output circuit at which the sampled color signal and the burst are to appear connected to the plate of said first amplifier, means for applying a direct current potential to the grid of said first amplifier, means for applying a less positive direct current potential to the grid of said second amplifier, a third amplifier having at least a plate, a cathode and a grid, a load impedance connected between the plate of said third amplifier and said source of positive direct current potential, means for connecting the cathodes of said first and second amplifiers and the plate of said first amplifier together at a common junction, the quiescent current drawn by said third amplifier through its load impedance being sufficient to maintain said junction at a positive potential that is greater than the positive potential applied to either of the grids of said first and second amplifiers, a source of a color signal, means for applying the color signal to the grid of said third amplifier so as to vary its impedance in accordance with the color signal, an impedance coupled between the cathode of said third amplifier and ground, a source of positive horizontal blanking pulses, means for coupling the latter pulses from their source to the cathode of said third amplifier, the amplitude of said pulses being sufficient to cut off said third amplifier, a fourth amplifier having at least a plate, a cathode and a grid, means for coupling said plate to said junction, means for coupling its cathode to ground, a source of positive pulses, each pulse occurring during the portion of the horizontal blanking interval during which said burst is to be applied to the output circuit coupled to the plate of said first amplifier, and means including a condenser and a grid leak resistor adapted to couple said latter positive pulses to the grid of said fourth amplifier.

5. Apparatus as set forth in claim 4 having a diode, means for connecting the plate of said diode to said junction and means for connecting the cathode of said diode to a source of positive potential that is greater than the potential supplied to either of the grids of said first and second amplifiers so that said junction never exceeds the potential applied to the cathode of the diode, the recovery time of the third amplifier thus being reduced.

References Cited in the file of this patent

UNITED STATES PATENTS

| | | |
|---|---|---|
| 2,423,769 | Goldsmith | July 8, 1947 |
| 2,505,589 | Somers | Apr. 25, 1950 |
| 2,545,325 | Weimer | Mar. 13, 1951 |
| 2,572,016 | Elbourn | Oct. 23, 1951 |
| 2,572,792 | White | Oct. 23, 1951 |
| 2,586,151 | Costello | Feb. 19, 1952 |